United States Patent

[11] 3,607,299

[72] Inventor Gregory L. Bolt
  Cincinnati, Ohio
[21] Appl. No. 855,364
[22] Filed Sept. 4, 1969
[45] Patented Sept. 21, 1971
[73] Assignee The Procter & Gamble Company
  Cincinnati, Ohio

[54] METHOD OF MAKING A DISPOSABLE POUCHED COFFEE PRODUCT
  8 Claims, No Drawings
[52] U.S. Cl. .................................................... 99/77.1, 99/66
[51] Int. Cl. .................................................... B65b 29/02
[50] Field of Search ........................................ 99/66, 77.1

[56] References Cited
UNITED STATES PATENTS
3,511,666  5/1970  Hudson et al. ................. 99/77.1
FOREIGN PATENTS
808,588  3/1969  Canada ........................ 99/66

Primary Examiner—Frank W. Lutter
Assistant Examiner—William L. Mentlik
Attorney—Edmund J. Sease ABSTRACT: A method of making a disposable pouched coffee product comprising compressing roast and ground coffee to provide a loosely agglomerated coffee ring, encasing said agglomerated coffee ring in a water-permeable fabric filter pouch and disintegrating said agglomerated coffee ring to provide particulate compressed coffee in a pouch.

METHOD OF MAKING A DISPOSABLE POUCHED COFFEE PRODUCT

Background of the Invention

The use of packets for the preparing of essence containing beverages is commonplace. For example, tea has been marketed in tea bags for many years and has enjoyed a great deal of commercial success. Packets, particularly water-permeable packets, containing roast and ground coffee are also old and well known in the art. Many attempts have been made to prepare a packet for the brewing of coffee in an attempt to duplicate the success of the tea bag but have not resulted in the commercial success and ready acceptance of the tea bag.

Examples of coffee in a packet as a well known product are as follows: Holland in U.S. Pat. No. 1,454,739 discloses a substantially circular cartridge constructed from a suitable fabric material containing coffee for use in a percolator. Abrahams in U.S. Pat. No. 2,531,594 discloses coffee packaged in a nonwoven fabric "tea bag"; Hiscock in U.S. Pat. No. 3,183,096 discloses a coffee packet of synthetic filter paper containing particles of coffee; Petrozzo in U.S. Pat. No. 3,373,677 discloses a nondivisible packet having a pinked circumference; and Barnett in U.S. Pat. No. 2,791,505 discloses a "Siamese" twin pair of infusion packets suitable for use as tea or coffee pouches.

The coffee packets heretofore known in the art all had definite disadvantages. For example, using the prior art coffee packets or pouches, the two terms being used here interchangeably, generally produced a very weak brew primarily because the packet fabric inhibited extraction. In order to produce a coffee brew from a packeted product which did not exhibit inhibited extraction and weak brew characteristics, the amount of ultrafine grind roast and ground coffee contained in the pouch was increased to provide more acceptable flavor and strength characteristics. However, increasing the amount of ultrafine roast and ground particles was not without its own disadvantages. That is to say, by increasing to a high level the amount of fine roast and ground coffee particles, the level of sediment and/or the amount of fines present in the coffee beverage was substantially increased. Consumers expressed a great dislike for the increased level of pot or cup sediment. Conversely, to reduce the level of sediment to an acceptable level required increasing the roast and ground coffee particle size which, in turn, brought about the heretofore described fabric inhibiting effect which provided a brew which was unsatisfactory in strength and flavor characteristics.

The ideal pouched coffee product would be one which produced a high level of extractibility and therefore a cup of beverage of high strength and flavor characteristics coupled with a total lack of cup or pot sediment. Several recent approaches have been taken to solve this problem. For example, copending and commonly assigned patent application Heusinkveld entitled "Pouched Flaked Coffee", Ser. No. 763,411, filed Sept. 27, 1968, relates to the use of flaked roast and ground coffee in a coffee pouch. The flaked roast and ground coffee is prepared by roll milling roast and ground coffee particles. Another approach in solving the problem, i.e. to provide increased extraction coupled with little or no pot sediment is represented by Canadian Pat. No. to Mahlmann et. al. 808,588, issued Mar. 18, 1969, entitled "A Method of Making Coffee Tablets.". The Mahlmann patent describes a stable coffee tablet capable of being placed in low cost containers which is made by the following method: Roast and ground coffee is compressed into tablets at a critical pressure of between 8,000 p.s.i.g. and 13,000 p.s.i.g. The compression disrupts the coffee cellular structure and forms the coffee particles into a tablet or ring.

While the hereinbefore described Heusinkveld method of providing a pouched flaked product is an excellent method of overcoming the hurdle in providing a strong, highly extractable pouched product characterized by little or no pot sediment, it would be desirable to provide a variety of kinds of pouched coffee products to satisfy variable coffee consumer preferences. In addition, the Huesinkveld method is not as efficient from a processing standpoint as the method of this invention because of the problems encountered in filling coffee pouches with particulate compressed coffee. This problem is overcome by the process of this invention because in the process of this invention the coffee to be encased in a pouch is in the form of a loosely agglomerated coffee ring.

Likewise the heretofore mentioned Canadian patent method of solving the problem is a satisfactory method, but here again the consumer with his capricious taste may not like compressed tablet or brickettelike products. Moreover, compressed tablets are difficult to preserve structurally during packaging and transportation. Additionally when the compressed tablet is placed in a disposable water-permeable fabric pouch and used in a percolator, upon contact with water, the coffee tablet swells and sometimes can split the disposable pouch fabric which, of course, is undesirable. Additionally, the use of a compressed ring, because less coffee surface is exposed, takes longer times to extract and is more difficult to wet and has been found to provide a slight decrease in coffee aroma. However, compression into a ring has one principal advantage in that substantially greater amounts of roast and ground coffee can be placed in any packet of a given size.

Cellular disruption of coffee particles is needed to provide increased extractibility which in turn compensates for any fabric inhibition to extraction. However, substantial cellular disruption is accompanied with the attendant disadvantage in that much coffee aroma is lost. For example, if high pressure are utilized to provide a cell disrupted coffee, i.e. from 7,500 p.s.i.g. to 14,000 p.s.i.g., while sufficient cellular disruption occurs to provide a highly extractable product a substantial decrease in flavor and aroma occurs.

Accordingly, it is an object of this invention to provide a new process for making a highly extractable disposable pouched coffee product containing particulate compressed coffee. The resulting product provides little or no pot sediment and is high in consumer acceptable coffee aroma.

This and other objects will become apparent from the following description of the invention.

SUMMARY OF THE INVENTION

This invention relates to a method of making a disposable pouched coffee product comprising;
1. Compressing roast and ground coffee at a pressure of from 3,000 p.s.i.g. to 6,000 p.s.i.g. for a time of from 0.1 seconds to 3.0 seconds to disrupt the cellular structure of said coffee and to provide a loosely agglomerated coffee ring;
2. Encasing said agglomerated coffee ring in a water-permeable fabric filter material to provide an encased loosely agglomerated coffee ring; and
3. Disintegrating said agglomerated ring to provide particulate compressed coffee in a fabric filter material pouch.

DETAILED DESCRIPTION

In the first step of the process of this invention roast and ground coffee particles are loosely agglomerated to provide a coffee ring. The particle agglomeration process comprises compressing roast and ground coffee at a pressure of from 3,000 p.s.i.g. to 6,000 p.s.i.g. and preferably from 4,000 p.s.i.g. to 5,000 p.s.i.g. Compressing roast and ground coffee as described in this step disrupts the cellular structure of the coffee and provides an easily handleable loosely agglomerated coffee ring.

It is important that the compressing pressure be within the range of from 3,000 p.s.i.g. to 6,000 p.s.i.g. If the pressure is less than 3,000 p.s.i.g. it is insufficient to provide substantial cellular disruption of the coffee cells and, therefore, little or no increase in extraction properties of the coffee is noted. That is to say, if the pressure is less than 3,000 p.s.i.g. once the coffee is placed inside of a brewing packet or pouch the coffee still exhibits the heretofore referred to tendency to form a weak brew because of fabric inhibition to complete extraction. Also if less than 3,000 p.s.i.g. pressure is used the pressure is less than the required minimum to form a loosely agglomerated coffee ring; as previously mentioned, formation of a compressed tablet or ring is important to this process because it is a method of getting large amounts of ground coffee into the small volume of a pouch.

It is equally as important that the pressure utilized to provide a size enlarged loosely agglomerated coffee ring not be in excess of 6,000 p.s.i.g. As hereinafter explained, providing a coffee ring as described herein is found to be the most convenient method of readying the cell-disrupted coffee for encasing in a heat sealable water-permeable fabric filter pouch. The importance of utilizing pressures not in excess of 6,000 p.s.i.g. will readily be seen from the description of the subsequent steps of the process of this invention; however, briefly the purpose is to provide a loosely agglomerated coffee ring so that it can readily be shattered or disintegrated in subsequent process steps of the invention. At pressures above 6,000 p.s.i.g., for example, from 7,500 p.s.i.g. to 14,000 p.s.i.g. the agglomerated coffee ring is so compressed that it becomes brickettelike and not susceptible to disintegrating easily to provide particulate compressed coffee.

When roast and ground coffee is compressed at the hereinbefore indicated pressures it will be found that substantial degassing of the coffee will be achieved. In subsequent packaging, this allows the coffee to be packed in low cost containers which need not be resistant to deformation due to internal pressure developed during storage. In this regard it should be noted that conventional vacuum packed roast and ground coffee can develop up to 1 p.s.i.g. of internal pressure during routine storage. Also, during the hereinbefore described compressing operation the soluble solids extraction yield can be increased by 10–25 percent to give a stronger cup of coffee beverage when compared to an equivalent charge of freshly roast and ground coffee. It is believed that this 10–25 percent increase in soluble solids extraction yield is the reason that the fabric inhibition phenomenon is not noticeable to the consumer when using the pouched product made in accord with the process of this invention.

As hereinbefore stated, compression at the indicated pressures provides a loosely agglomerated coffee ring. This compression step can be accomplished by several chemical engineering apparatuses. For example, it can be accomplished in manners shown in Perry Chemical Engineers Handbook, 3rd ed., pages 1,179 to 1,192 which are incorporated herein by reference. The most satisfactory results have been obtained when compression to provide a loosely agglomerated coffee ring is accomplished utilizing a compression die and a tableting machine.

In forming loosely agglomerated coffee rings the whole beans are ground to a normal roasted and ground coffee size distribution wherein about 85 percent of the coffee particles are between 12 and 40 mesh U.S. Standard Screen Sieve and about 15 percent are less than 40 mesh. The ground coffee is then placed in a coffee ring mold or die and compressed within the above-described critical pressure range. This pressure is applied for a sufficient period of time to hold the particles together in the shape of a coffee ring and to disrupt the particle cellular structure but an insufficient time to form a hard brickettelike ring. For a coffee ring in the shape of a doughnut or disk which is the most convenient shape for subsequent encasing by heat sealing in a water-permeable disposable fabric filter pouch it is preferred that the ring have a thickness of from one-fourth of an inch to one-half of an inch and a diameter of from 2–3 inches. From 0.1 to 3.0 seconds and preferably from 0.2 seconds to 1 second residence time in the compressing machine is sufficient to retain the coffee ring in its shape or form in a loosely agglomerated structure of sufficient integrity to allow easy subsequent encasement in a water-permeable pouch without a high incidence of fracturing occurring; yet the pressure is low enough to allow subsequent disintegration by a disintegrating force to provide a packeted product of large, cell disrupted particles which has increased extractibility without producing accompanying high levels of fines and pot sediment.

In the second step of the process of this invention, the above-described loosely agglomerated coffee ring is encased in a water-permeable fabric filter pouch. No special criticality exists in regard to the method of encasing and any suitable means can be employed. In one particularly satisfactory method the loosely agglomerated coffee rings are placed upon a large sheet of the water-permeable fabric filter pouch and a second sheet is placed over the coffee rings whereupon a heat sealing die presses the lower and upper sheets together to form a heat sealed packet having encased therein a coffee ring. The packet can be subsequently trimmed to provide a convenient substantially circular packet.

While the loosely agglomerated coffee ring encasing step can be accomplished by means other than heat sealing, such as sewing or stitching, it is preferred from a process economics and efficiency standpoint that heat sealing be the method employed.

The water permeable fabric filter pouch utilized in the preferred encasing by heat sealing step to provide a disposable packet is preferred to be substantially circular in shape. This is so only because percolator baskets of most coffee pots are themselves substantially circular in shape. The exact shape used is determined to a certain extent by the brewing method employed. The exact size of the pouched packet containing the loosely agglomerated coffee ring is not a critical aspect of this invention. The controlling feature in determining the packet size is the size of the coffee ring and the size of the percolator basket into which the encased ring is to be placed.

The water permeable fabric from which the encasing pouch is constructed can be any type of fabric which is chemically inert and essentially taste-free and heat sealable. The pouch can be formed from both woven and non-woven fabrics. Included within the class of nonwoven and woven fabrics are fabrics made of rayon, nylon, polyesters, polyacrylic, and polypropylene fabrics and natural fibers made of hemp and cotton fibers. In order to accomplish the advantages of this invention the type of fabric, whether a natural or synthetic fabric is used, should be essentially taste-free. In addition, combinations of fibers can be used to prepare fabrics suitable for use in the encasing procedure of this invention, especially where increased fabric strength or increased fabric porosity is desired. Particularly preferred are the non-woven fabrics comprising fibers of rayon, nylon, polypropylene and hemp, or mixture thereof. For the purposes of this invention the specific type of fabric or fibers used is immaterial so long as the fabric is chemically inert and essentially taste-free and sufficiently strong, both dry and wet, to remain an integral unit throughout normal handling, packaging, shipment, brewing of coffee beverage and disposing of the spent packet. Although it is essential that the fabric used for preparing the packet or pouch be permeable to water the pores in the fabric allowing water permeability should be of such a nature and size that the particulate compressed coffee particles, formed as hereinafter explained, do not pass through into the brewing water. The fabric must act as a filtering means to accomplish or to aid in the accomplishment of the prevention of sediment in the brewed coffee. The fabric thickness used can vary but will generally range from 0.002 inch to 0.12 inch preferably from 0.003 inch to 0.009 inch.

The size of the pores of the fabric utilized in the encasing procedure of this second step can vary from 5 microns to 1,000 microns, preferably from 20 micron to 200 microns. If a substantial portion of the fabric pores are smaller than approximately 5 microns it may be impossible, irrespective of time to extract all of the desired components and constituents from the encased coffee. Additionally where the pore size is extremely fine inordinately long brewing times are needed, and with the high proportion of automatic brewing devices presently in use for brewing coffee small pore sizes would provide an unsatisfactory and unsavory beverage. Pore openings larger than about 1,000 microns are to be avoided since they permit some coffee particles to pass into the beverage which may result in a high level of pot sediment.

The fabric utilized in the encasing procedure of this second step can be made heat sealable by impregnation with a heat sealable binder by processes well known in the art. The binders which are capable for heat sealing are those which have a melting point lower than the softening or charring point of the fabric material but higher than the temperature of boiling water. The binder must be chemically inert and essentially taste free. It is desired that the binder be sufficiently inert and insoluble in hot water so that no adverse physiological effect form consumption of the beverage can result. Examples of suitable binders for heat sealing of the above described fabric materials are polymeric binders, as for example, polymeric binders described in U.S. Pat. No. 3,183,096, the disclosure of which is incorporated herein by reference.

To effect heat sealing of the heat sealable binder impregnated fabric, heat and pressure may be applied by utilization of heat sealing devices, the construction and operation of which are well known in the art and therefore not described in detail herein. To effect the heat seal of the fabrics employed in the encasing procedure of this step, pressures in the range of from 10 p.s.i.g. to 500 p.s.i.g. may be used along with temperatures of from about 320° F up to about 480° F with a preferred temperature range of from 375° F to 400° F.

The product of the second step is a water-permeable filter fabric encasing a loosely agglomerated coffee ring which is as heretofore mentioned not in of itself a readily consumer acceptable product. This is so because during brewing the loosely agglomerated ring swells slightly which often results in a rupture of the encasing fabric filter material which, in turn, causes ground coffee particles to escape into the pot causing a high level of pot and cup sediment. Additionally, if the product were used in its agglomerated ring form insufficient water to coffee contact area exist with the result being that the increased extraction propensity of cell disrupted coffee is not exhibited and a sufficiently high level to overcome the barrier effect of the fabric filter pouch and consequently the resulting brew is weak and unsavory.

Despite the above-mentioned disadvantages relating to a compressed coffee ring contained in a pouch, it is important that the cell disrupted coffee by loosely agglomerated, using the hereinbefore described pressures, prior to encasement in the water permeable pouch because no other method of placing large amounts of compressed coffee in a packet of convenient brewing size is available. Thus, loose agglomeration allows increased quantitites of cell disrupted coffee to be placed in a given volume and because the coffee particles are only loosely agglomerated, in accord with the third step of the process of this invention as hereinafter explained, the coffee ring can subsequently be disintegrated to provide particulate compressed coffee in a pouch. Thus, the principal advantage of agglomeration, i.e. increasing the quantity of coffee/unit of volume is retained without the heretofore mentioned disadvantages of agglomerated compressed coffee rings.

To overcome the above enumerated disadvantages of agglomerated pouched encased coffee rings, the loosely agglomerated fabric encased coffee ring is subjected to disintegration by mechanical means to provide particulate compressed coffee in a pouch. Because the particles have been previously compressed they are cell disrupted and because they have previously been loosely agglomerated and then subjected to a disintegrating force they are larger than usual ground coffee particles and consequently they exhibit little tendency to escape through the fabric filter and provide undesirable levels of cup and pot sediment.

No special criticality exist with respect to the mechanical means used to provide the disintegrating effect of the third step of this process. Suitable mechanical devices for size reduction are disclosed in detail in the previously incorporated Perry reference at pages 1,107 through 1,166. Generally satisfactory results have been obtained when the disintegrating mechanical means used is impacting the loosely agglomerated encased ring against a solid surface by passing the ring through spaced rollers in a roll mill to provide a light impacting force which disintegrates the agglomerated ring. While utilization of spaced rolls and a roll milling operation is preferred because it can be accomplished in a continuous manner, the disintegration can be accomplished by utilization of other means such as vibration, crushing, and ultrasonic means. The most important limitation placed upon the means of disintegration is that it must not be so severe that it causes rupturing or tearing of the encasing fabric filter pouch. Generally satisfactory results are obtained when the disintegrating or impacting force, the two terms being used interchangeably, is within the range of from 5 p.s.i. to 50 p.s.i. and preferably from 10 p.s.i. to 20 p.s.i. Utilization of pressures within these ranges is sufficient to disintegrate the agglomerated ring and yet not so high that they destroy the integrity of the pouch.

In utilizing vibratory means a plurality of the loosely agglomerated encased coffee rings are placed in an enclosed vessel which is mounted so as to provide a means of vibration. The vessel is subsequently subjected to vibratory forces which in turn causes the encased agglomerated coffee rings to be jostled about, thrown against the side of the vessel, and against each other, resulting in disintegration of the loosely agglomerated ring.

Subjection to the disintegrating force must not continue for such a long time that total disintegration resulting in ultra fine particles occurs. This is so because producing a high level of fines as hereinbefore explained results in an increased propensity for the particles to migrate through the encasing pouch and cause pot sediment during brewing and a resulting cup sediment. Generally from 0.3 seconds to 3.0 seconds is a sufficient period of time. As used herein the term disintegrating force refers to the force required to be applied to an agglomerated coffee ring to break up or fragment the ring to provide particulate compressed coffee.

With regard to the preferred disintegrating and impacting means of roll milling the rolls should be spaced a distance about one-sixteenth of an inch less than the thickness of the loosely agglomerated coffee ring. This provides only a slight impacting force which is all that is required to destroy the integrity of the coffee ring. If the coffee ring is within the preferred range of thickness of from one-fourth inch to one-half inch the roll space should be within the range of from three-sixteenth to seven-sixteenth inch. Roll spaces within this range have been found to provide a moderate impacting or disintegrating force to provide particulate compressed coffee of a suitable size to allow for increased extraction resulting in a stronger brew and also provide compressed particles which are large enough so that pot sediment and cup sediment levels are not at a consumer unacceptable level.

The following Example is offered to illustrate but not limit the invention as disclosed herein.

EXAMPLE I 29.8 grams of freshly roasted and ground coffee having a particle size wherein 85 percent of the particles are between 12 and 40 mesh U.S. Standard Sieve and 15 percent are less than 40 mesh is placed in a tableting die having an outside diameter of 7.14 cm. and is compressed at a pressure of 4,500 p.s.i.g. for 0.3 seconds. The charge of coffee is reduced in height from sixty-five sixty-fourth inches to thirty-one sixty-fourth inches and is 3 inches in diameter. The compressed coffee is examined and found to be a loosely agglomerated coffee ring in the shape of a doughnut.

Thereafter the tablet is encased in a filter fabric material comprised of a nonwoven rayon/polypropylene mixture impregnated with a polymeric heat sealable binder. The encasing is accomplished by placing a sheet of the fabric below the compressed coffee ring and a second sheet of the fabric above the coffee ring and thereafter encasing the coffee ring therein by heat sealing by the utilization of a heat sealing die of a shape substantially similar to that of the ring. The packet is heat sealed by applying the die at a pressure of 20 p.s.i.g. and a temperature of 380° F to the edges of the fabric for about 5 seconds.

Thereafter, the fabric filter material encased loosely agglomerated coffee ring is disintegrated to provide particulate compressed coffee in a pouch. The agglomerated coffee ring structure is disintegrated by passing the fabric encased coffee ring through two parallel spaced roll mills. The roll speed is 20 ft./min. and the space between the two rolls is twenty-seven sixty-fourth inches. The disintegrating pressure, i.e. impacting force is 15 pounds per square inch and the time of application of this pressure to each packet is about 0.5 seconds.

In evaluating the pouched particulate compressed coffee made in accord with the process of this invention two packeted coffee products are compared in regard to the quality of beverage produced. The first packet (packet I) is the above-referred to packeted product made in accord with the process of this invention. A second product (packet II) is made in accord with the process of this invention except that the disintegrating step is not employed and the compressing pressure is 9,000 p.s.i.g. packet II contains an agglomerated coffee ring and Packet I contains particulate compressed coffee. The two packets are separately placed in two conventional percolators, each percolator containing the same amount of water and allowed to perk until the temperature reaches 180° F at which time the coffee beverage is poured into cups to be tasted by a panel of four expert tasters.

In testing the coffee beverage produced from packets I and II the panel notes that the cups of beverage from packet I are stronger in flavor, have a good coffee aroma and contain only a slight amount of cup sediment. Packet I itself is examined and found to be completely intact and without any signs of stress, tearing, or rupture. In regard to packet II which contains an agglomerated coffee ring which has not been disintegrated to provide a particulate compressed coffee in a pouch, the panel notes that the beverage is weaker in strength, less aromatic, and has a high incidence of cup sediment. In examining packet II after brewing it is noted that the packet shows some evidence of weakening and slight tearing on the surface which it is believed allowed some of the grounds contained in packet II to exit and provide a high level of cup and pot sediment.

What is Claimed is:

1. A method of making a disposable pouched coffee product, comprising;
    a. Compressing roast and ground coffee at a pressure of from 3,000 p.s.i.g. to 6,000 p.s.i.g. for a time of from 0.1 seconds to 3.0 seconds to disrupt the cellular structure of said coffee and to provide a loosely agglomerated coffee ring;
    b. Encasing said agglomerated coffee ring in a water-permeable fabric filter material to provide an encased loosely agglomerated coffee ring; and
    c. Disintegrating said agglomerated ring to provide particulate compressed coffee in a fabric filter material pouch.

2. The process of claim 1 wherein the compressing pressure is from 4,000 p.s.i.g. to 5,000 p.s.i.g.

3. The process of claim 1 wherein the time is from 0.2 seconds to 1.0 seconds.

4. The process of claim 1 wherein the compressing pressure is from 4,000 p.s.i.g. to 5,000 p.s.i.g. and the time is from 0.2 seconds to 1.0 seconds.

5. The process of claim 1 wherein the fabric filter material contains a heat sealable binder and encasing is accomplished by heat sealing at a heat sealing pressure of from 10 p.s.i.g. to 500 p.s.i.g. and at a heat sealing temperature of 320° F to 480° F.

6. The process of claim 5 wherein said heat sealing temperature is from 375° F to 400° F.

7. The process of claim 1 wherein disintegrating to provide particulate compressed coffee in a fabric filter material pouch is accomplished by roll milling said encased loosely agglomerated coffee ring and wherein the disintegrating pressure is from 5 p.s.i. to 50 p.s.i.

8. The process of claim 7 wherein the disintegration pressure is from 10 p.s.i. to 20 p.s.i. and is applied for from 0.3 seconds to 3.0 seconds.